Nov. 8, 1932.  L. T. SMITH  1,887,171
CRYSTALLINE FENCHYL ALCOHOL AND METHOD
OF SEPARATING THE SAME FROM PINE OIL
Filed Aug. 11, 1927
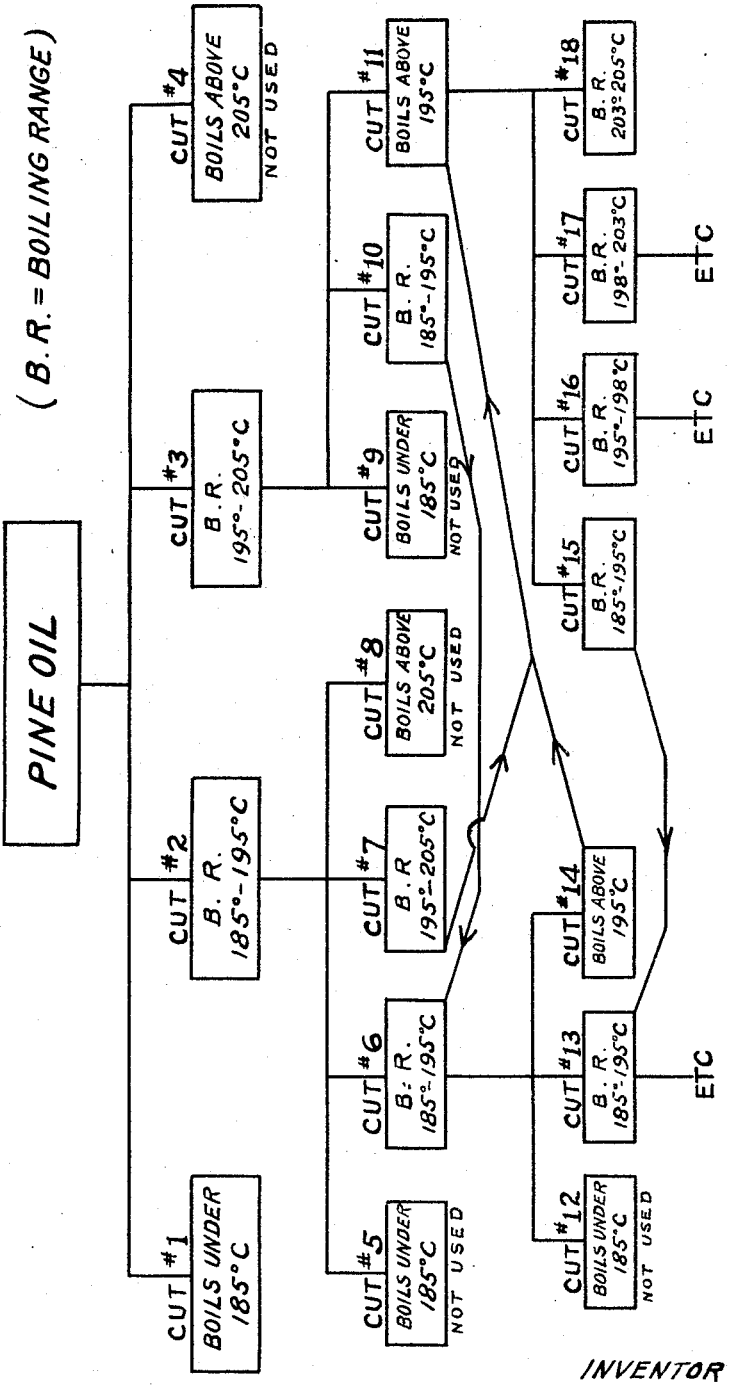
WITNESS:
INVENTOR
Lee T. Smith
BY
ATTORNEYS.

Patented Nov. 8, 1932

1,887,171

UNITED STATES PATENT OFFICE

LEE T. SMITH, OF KENVIL, NEW JERSEY, ASSIGNOR TO HERCULES POWDER COMPANY, OF WILMINGTON, DELAWARE, A CORPORATION OF DELAWARE

CRYSTALLINE FENCHYL ALCOHOL AND METHOD OF SEPARATING THE SAME FROM PINE OIL

Application filed August 11, 1927. Serial No. 212,301.

My invention relates to fenchyl alcohol in crystalline form and to a method for separating the same from pine oil.

Heretofore fenchyl alcohol having a boiling point of about 201° C. has been recognized as a constituent of pine oil but such has not been heretofore obtained in crystalline form nor has it heretofore been separated from pine oil.

Now it is the object of my invention to provide fenchyl alcohol in crystalline form and to provide a method whereby fenchyl alcohol may be separated from pine oil in crystalline form and whereby substantial yield of fenchyl alcohol in crystalline form may be obtained at a minimum of expense.

According to the method embodying my invention pine oil, such as is obtained by any well known method from pine wood, is fractionated and refractionated to obtain cuts having a boiling range between about 185° C. and about 195° C. and between 195° C. and 205° C. in which fenchyl alcohol will be concentrated and from which the fenchyl alcohol may be crystallized by refrigeration, or by cooling and seeding with, preferably a crystal of fenchyl alcohol, or by cooling and inducing crystallization by mechanical means, as by adding a small piece of glass, a grain of sand or the like.

As an example of the carrying out of the method embodying my invention and with reference to the accompanying drawing in which is shown a flow sheet, the pine oil is fractionated into four cuts indicated on the accompanying drawing as cuts numbers 1, 2, 3 and 4. Cuts numbers 1 and 4 are set aside and cuts numbers 2 and 3 are fractionated into cuts numbered 5, 6, 7 and 8 and 9, 10 and 11, respectively, on the accompanying drawing.

Cuts #5, #8 and #9 are set aside, while cut #10 is added to cut #6 and cut #7 is added to cut #11.

The admixed cuts numbers 6 and 10 are fractionated into cuts numbered 12, 13 and 14 on the accompanying drawing.

Cut #12 is set aside and cut #14 is added to cut #11. Cut #11, to which it will be observed has been added cuts #7 and #14, is then fractionated into cuts numbered 15, 16, 17 and 18 on the accompanying drawing. If desired cut #15 may be added to cut #13 and refractionated. The cuts #15 and #13, it will be noted, are of the same boiling range with cuts #6 and #10, which were admixed and refractionated.

After completion of the refractionation of the several cuts, those cuts having a boiling point or range between 195° C. and 205° C. are refrigerated to effect crystallization of fenchyl alcohol, or they may be refrigerated or cooled and seeded to effect crystallization of fenchyl alcohol, or crystallization may be induced by mechanical means, as indicated. After crystallization of fenchyl alcohol, fenchyl alcohol is separated from the mother liquor by, for example, filtering or centrifuging.

It will now be noted that the fractionation and refractionation of the pine oil concentrates the fenchyl alcohol into fractions boiling, as has been indicated, within the range 195° C.–198° C. and 198° C.–203° C., from which fractions it may be crystallized out in substantially pure form and the crystallized fenchyl alcohol readily separated from the mother liquor.

After the recovery of the crystallized fenchyl alcohol by filtration, or centrifugation, the filtrate may be subjected to treatment, to effect the dehydration of the tertiary alcohols present and further quantities of fenchyl alcohol may be recovered by fractionating the filtrate. It will be noted that the tertiary alcohols present in a pine oil cut rich in fenchyl alcohol, due to the closeness of their boiling points with that of fenchyl alcohol, will be converted by the dehydration into hydrocarbons and water and hence their effect in negativing crystallization of fenchyl alcohol due to their solvent action on the fenchyl alcohol, will be eliminated.

In the carrying out of the method embodying my invention, it will be observed that from the broad standpoint I contemplate the fractionation of pine oil to obtain a plurality of cuts of such boiling range that they will contain substantially all of the fenchyl alcohol of the original pine oil, then the concentration of the cut or cuts, containing a less proportion of fenchyl alcohol than the richest cut, or refractionation of all the cuts, in order to obtain distillates of increased richness from the standpoint of fenchyl alcohol concentration, followed by refractionation of the distillate or distillates of increased richness in admixture with the original cut or cuts of maximum richness or the distillates obtained as a result of refractionation of richer cuts.

The mixed distillate or mixed distillates and cuts are then refractionated to obtain a distillate of maximum richness from which the fenchyl alcohol may be obtained in crystalline form by cooling and seeding with a crystal, preferably of fenchyl alcohol, or by merely cooling sufficiently to effect crystallization. The crystallized fenchyl alcohol may be readily separated out by filtration or centrifugation. The filtrate or mother liquor obtained after removal of the crystalline fenchyl alcohol may then, if desired, be treated to effect the dehydration of the tertiary alcohols present and further fenchyl alcohol removed therefrom by crystallization after refractionation. In treating the filtrate to effect the dehydration of the tertiary alcohols, the filtrate may be distilled with a dehydrating agent such, for example, as fuller's earth, activated carbon, an acid, an acid salt, iodine, or the like.

Thus, it will be observed that the method according to my invention contemplates broadly the concentration of fenchyl alcohol in separate cuts, either directly or by refractionation of the cuts, then concentration by refractionation of the concentrated cuts in admixture and finally recovery of the fenchyl alcohol from a cut of maximum concentration.

In carrying out the method embodying my invention no special apparatus is required and the fractionation of the pine oil and refractionation of the cuts may be carried out with or without steam and under atmospheric or reduced pressure, the final distillate being cooled in any convenient manner and to a sufficient degree to effect crystallization of the fenchyl alcohol or to enable its crystallization to be induced by seeding or mechanical means.

It will be understood that the carrying out of my invention as described herein specifically with reference to the accompanying drawing is by way of example only and shall not be taken as limiting my invention in its broader aspect.

Having now fully described my invention, what I claim and desire to protect by Letters Patent is:—

1. The method of separating fenchyl alcohol from pine oil, which includes fractionating pine oil to obtain a cut rich in fenchyl alcohol, dehydrating tertiary alcohols present in the cut to effect their conversion to hydrocarbons and water without substantial dehydration of fenchyl alcohol, fractionating off hydrocarbons and water, refrigerating the residue to effect crystallization of fenchyl alcohol and separating crystalline fenchyl alcohol.

2. The method of separating fenchyl alcohol from pine oil, which includes fractionating pine oil to obtain a cut boiling under normal atmospheric pressure largely at about 195–205° C. and rich in fenchyl alcohol, dehydrating tertiary alcohols present in the cut to effect their conversion to hydrocarbons and water without substantial dehydration of fenchyl alcohol, fractionating off hydrocarbons and water, refrigerating the residue to effect crystallization of fenchyl alcohol and separating crystalline fenchyl alcohol.

3. The method of separating fenchyl alcohol from pine oil, which includes fractionating pine oil to obtain a cut boiling under normal atmospheric pressure largely at about 195–205° C. and rich in fenchyl alcohol, dehydrating tertiary alcohols present in the cut to effect their conversion to hydrocarbons and water without substantial dehydration of fenchyl alcohol, fractionating off hydrocarbons and water, separating from the residue a cut boiling at about 198–203° C., refrigerating said cut to effect crystallization of fenchyl alcohol and separating crystalline fenchyl alcohol.

4. The method of separating fenchyl alcohol from pine oil, which includes fractionating pine oil to obtain a cut rich in fenchyl alcohol refrigerating the cut to effect crystallization of fenchyl alcohol therefrom and dehydrating tertiary alcohols present in the mother liquor to effect their conversion to hydrocarbons and water without substantial dehydration of fenchyl alcohol refrigerating the cut to effect crystallization of fenchyl alcohol and separating crystalline fenchyl alcohol.

5. The method of separating fenchyl alcohol from pine oil which includes fractionating pine oil to obtain a cut rich in fenchyl alcohol dehydrating the cut to convert tertiary alcohols therein to hydrocarbons and water fractionating the dehydrated cut to separate hydrocarbons and water and to obtain a cut boiling at about 195–198° C. and a cut boiling at about 198–203° C. refrigerating the latter cut to effect crystallization of fenchyl alcohol therefrom, and mixing the mother liquor with the former cut, refractionating the mixture to obtain a cut boiling about 198–203° C., refrigerating said cut to effect crystallization of fenchyl alcohol therefrom, and separating crystalline fenchyl alcohol.

6. The method of separating fenchyl alcohol from pine oil, which includes fractionating pine oil to obtain a cut rich in fenchyl alcohol, dehydrating tertiary alcohols present in the cut to effect conversion to hydrocarbons and water without substantial dehydration of fenchyl alcohol, fractionating off hydrocarbons and water, distilling off a cut rich in fenchyl alcohol, refrigerating the cut to effect crystallization of fenchyl alcohol and separating crystallized fenchyl alcohol.

7. The method of separating fenchyl alcohol from pine oil, which includes fractionating pine oil to obtain a cut boiling under normal atmospheric pressure largely at about 195–205° C. and rich in fenchyl alcohol, dehydrating tertiary alcohols present in the cut to effect their conversion to hydrocarbons and water without substantial dehydration of fenchyl alcohol, fractionating off hydrocarbons and water, distilling off a cut rich in fenchyl alcohol, refrigerating the cut to effect crystallization of fenchyl alcohol and separating crystallized fenchyl alcohol.

8. The method of separating fenchyl alcohol from pine oil, which includes fractionating pine oil to obtain a cut rich in fenchyl alcohol, refrigerating the cut to effect crystallization of fenchyl alcohol therefrom, dehydrating tertiary alcohols present in the mother liquor to effect their conversion to hydrocarbons and water without substantial dehydration of fenchyl alcohol, distilling off a cut rich in fenchyl alcohol, refrigerating the cut to effect crystallization of fenchyl alcohol and separating crystallized fenchyl alcohol.

9. The method of separating fenchyl alcohol from pine oil, which includes fractionating pine oil to obtain a cut rich in fenchyl alcohol, refrigerating the cut to effect crystallization of fenchyl alcohol therefrom, separating crystallized fenchyl alcohol from the cut, dehydrating tertiary alcohols present in the mother liquor to effect their conversion to hydrocarbons and water without substantial dehydration of fenchyl alcohol, distilling off a cut rich in fenchyl alcohol and refrigerating said cut to effect crystallization of fenchyl alcohol.

In testimony of which invention, I have hereunto set my hand, at Kenvil, New Jersey, on this 1st day of August, 1927.

LEE T. SMITH.